United States Patent
Benjamin et al.

(10) Patent No.: US 11,371,849 B2
(45) Date of Patent: Jun. 28, 2022

(54) SYSTEMS AND METHODS FOR DETERMINING VEHICLE USAGE

(71) Applicant: c/o Toyota Motor North America, Inc., Plano, TX (US)

(72) Inventors: Dany Benjamin, Rowlett, TX (US); Michael C. Edwards, McKinney, TX (US)

(73) Assignee: Toyota Motor North America, Inc., Plano, TX (US)

( * ) Notice: Subject to any disclaimer, the term of this patent is extended or adjusted under 35 U.S.C. 154(b) by 391 days.

(21) Appl. No.: 16/523,207

(22) Filed: Jul. 26, 2019

(65) Prior Publication Data
US 2021/0025715 A1    Jan. 28, 2021

(51) Int. Cl.
  *G01C 21/20*    (2006.01)
  *G07C 5/00*    (2006.01)
  *H04W 4/029*    (2018.01)
  *G06Q 50/30*    (2012.01)

(52) U.S. Cl.
  CPC ............. *G01C 21/20* (2013.01); *G06Q 50/30* (2013.01); *G07C 5/008* (2013.01); *H04W 4/029* (2018.02)

(58) Field of Classification Search
  CPC ....... G01C 21/20; H04W 4/029; G06Q 50/30; G07C 5/008
  USPC ........................................................ 701/519
  See application file for complete search history.

(56) References Cited

U.S. PATENT DOCUMENTS

| | | | |
|---|---|---|---|
| 2003/0036931 A1* | 2/2003 | Maulsby | G06Q 10/02 705/5 |
| 2004/0106399 A1* | 6/2004 | Ki | G07B 15/02 455/422.1 |
| 2007/0208501 A1* | 9/2007 | Downs | B60T 7/18 701/119 |
| 2016/0328669 A1* | 11/2016 | Droege | G06Q 10/06311 |
| 2018/0278722 A1* | 9/2018 | Jow | G01C 21/3697 |

OTHER PUBLICATIONS

Bloomberg, "The Car of the Future Will Sell Your Data," Fortune (2018) 4 pages (http://fortune.com/2018/02/20/car-future-sell-data-telenav/).
Holt, L., "Utilizing GPS Tracking to Monitor Personal Use of Company Vehicles," GPS Insight—The Insight Source Blog (2019) (http://www.gpsinsight.com/blog/utilize-telematics-monitor-personal-use-company-vehicles/ 10 pages.
(Continued)

*Primary Examiner* — Gertrude Arthur Jeanglaude
(74) *Attorney, Agent, or Firm* — Christopher G. Darrow; Darrow Mustafa PC

(57) ABSTRACT

System, methods, and other embodiments described herein relate to determining vehicle usage. In one embodiment, a method includes identifying a travel route of a vehicle, identifying a pattern of travel based on the travel route over a predetermined period of time, and determining whether the vehicle is being used as a private vehicle for an on-demand delivery service based on the pattern of travel. The method includes, when the vehicle is being used as a private vehicle for an on-demand delivery service, generating a notification to an entity associated with the vehicle, wherein the notification includes information relating to the vehicle being used as a private vehicle for an on-demand delivery service.

20 Claims, 5 Drawing Sheets

(56) References Cited

OTHER PUBLICATIONS

Furletti, B. et al., "Inferring Human Activities from GPS Tracks," Urb Comp (2013) (https://www.cs.uic.edu/~urbcomp2013/papers/Paper%2014_Barbara%20Furletti.pdf) 8 pages.

Henke, N. et al., "The Age of Analytics: Competing in A Data-Driven World," McKinsey Global Institute (2016) (https://www.mckinsey.com/~/media/McKinsey/Business%20Functions/McKinsey%20Analytics/Our%20Insights/The%20age%20of%20analytics%20Competing%20in%20a%20data%20driven%20world/MGI-The-Age-of-Analytics-Full-report.ashx) 136 pages.

Burns, E., "Location-tracking System Improves Busienss Efficiency," SearchBusinessAnalytics.com / TechTarget.com (2015) (https://searchbusinessanalytics.techtarget.com/feature/Location-tracking-system-improves-business-efficiency) 4 pages.

Karjian, R., "Location-tracking apps help pinpoint customers, workers," SearchCustomerExperience.com / TechTarget.com (2015) (https://searchcustomerexperience.techtarget.com/tip/Location-tracking-apps-help-pinpoint-customers-workers) 1 page.

Singh, S., "Are Car Companies Going to Profit From your Driving Data?," Forbes (2017) (https://www.forbes.com/sites/sarwantsingh/2017/11/06/are-car-companies-going-to-profit-from-your-driving-data/#4c2f8199143c) 5 pages.

\* cited by examiner

SYSTEMS AND METHODS FOR DETERMINING VEHICLE USAGE

TECHNICAL FIELD

The subject matter described herein relates, in general, to vehicles and, more specifically, to systems and methods for determining how a vehicle is being used.

BACKGROUND

Several entities may have an interest in how a vehicle is being used. Vehicles used for on-demand delivery services may incur significant wear and tear due to the relatively heavy use providing such a service involves. For example, vehicle owners (e.g., personal vehicle owners, company vehicle owners or vehicle leasing companies) may want to monitor how their vehicle is being used (by, e.g., friends, employees, or lessees) to prevent heavy use and undue wear and tear. As another example, a personal vehicle owner using a personal vehicle for on-demand delivery services may be interested in receiving related advertising while providing that kind of service. As another example, a company that insures a vehicle may want to monitor how the vehicle is being used to ensure that the risk it has undertaken is acceptable.

Monitoring a vehicle to determine whether it is being used for on-demand delivery is non-trivial because it is difficult, for a given route, to distinguish normal use from use for on-demand delivery service.

SUMMARY

In one embodiment, a method for determining vehicle usage is disclosed. In one embodiment, the method includes identifying a travel route of a vehicle, identifying a pattern of travel based on the travel route over a predetermined period of time, determining whether the vehicle is being used as a private vehicle for an on-demand delivery service based on the pattern of travel, and when the vehicle is being used as a private vehicle for an on-demand delivery service, generating a notification to an entity associated with the vehicle, wherein the notification includes information relating to the vehicle being used as a private vehicle for an on-demand delivery service.

In one embodiment, a system for determining vehicle usage is disclosed. The system includes a navigation system, configured to track movement of a vehicle. The system includes one or more processors and a memory communicably coupled to the one or more processors. The memory stores a route identification module including instructions that when executed by the one or more processors cause the one or more processors to identify a travel route of the vehicle based on at least the tracked movement of the vehicle. The memory stores a use determination module including instructions that when executed by the one or more processors cause the one or more processors to identify a pattern of travel based on the travel route over a predetermined period of time, and determine whether the vehicle is being used as a private vehicle for an on-demand delivery service based on the pattern of travel. The memory stores a notification module including instructions that when executed by the one or more processors cause the one or more processors to, when the vehicle is being used as a private vehicle for the on-demand delivery service, generate a notification to an entity associated with the vehicle, wherein the notification includes information relating to the vehicle being used as a private vehicle for the on-demand delivery service.

In one embodiment, a non-transitory computer-readable medium for determining vehicle usage and including instructions that when executed by one or more processors cause the one or more processors to perform one or more functions is disclosed. The instructions include instructions to identify a travel route of a vehicle, identify a pattern of travel based on the travel route over a predetermined period of time, and determine whether the vehicle is being used as a private vehicle for an on-demand delivery service based on the pattern of travel. The instructions include instructions to, when the vehicle is being used as a private vehicle for the on-demand delivery service, generate a notification to an entity associated with the vehicle. The notification includes information relating to the vehicle being used as a private vehicle for the on-demand delivery service.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
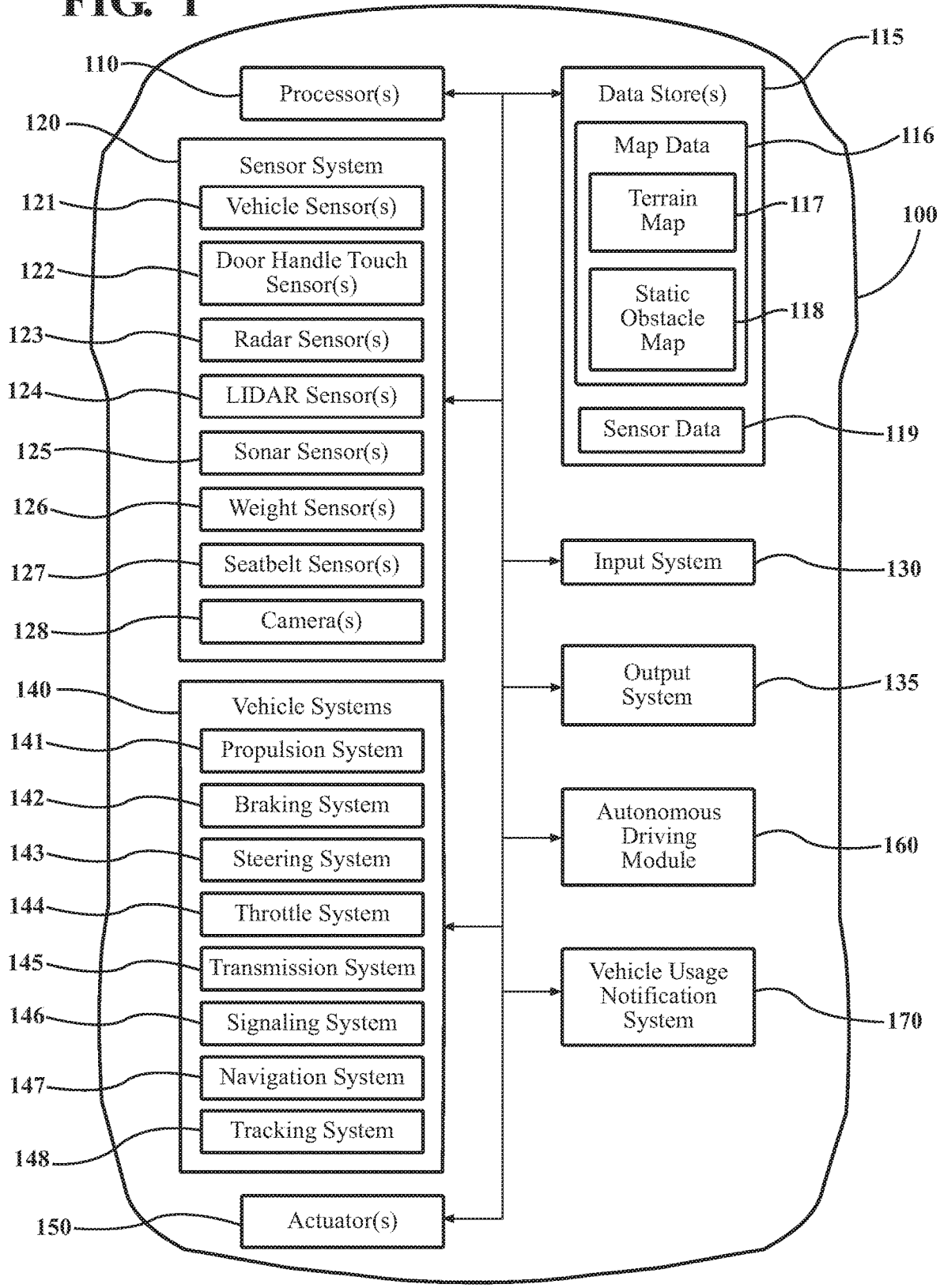
FIG. 1 illustrates one embodiment of a vehicle within which systems and methods disclosed herein may be implemented.

Systems, methods, and other embodiments associated with determining vehicle usage are disclosed.

As previously noted, vehicle owners, as well as other entities with an interest in a vehicle, may want to know how the vehicle is being used. Using a vehicle for an on-demand delivery service such as ride-sharing, item delivery service, or food delivery, can take a toll on the vehicle—aggravating wear and tear of the vehicle, increasing mileage, and/or increasing the likelihood of an accident. For example, an employer that owns a vehicle may want to know if an employee is using the vehicle as a private vehicle for an on-demand delivery service. As another example, a person who owns a vehicle and loans it to a friend may want to know if the friend is using the vehicle as a private vehicle for an on-demand delivery service.

Alternatively, a person who owns a vehicle and uses it for an on-demand delivery service may be interested in receiving information about on-demand delivery opportunities such as employment opportunities with other on-demand delivery services and/or locations with high demand for on-demand delivery service.

Systems and methods disclosed herein relate to notifying an entity associated with a vehicle upon determining that the vehicle is being used as a private vehicle for an on-demand delivery service. As previously mentioned, in one embodiment, the on-demand service may be one of three types—a ride-sharing service, an item delivery service, or a food delivery service. In other embodiments, other types of on-demand delivery services are possible. In this context, a "private vehicle" is a vehicle that is not owned or leased by a commercial on-demand delivery service, though it may be owned by a commercial entity of a different kind (e.g., a plumber or a carpet cleaning company). In other words, a "private vehicle" being used for on-demand delivery service is distinct from a commercial vehicle (such as taxi-cabs, delivery service trucks) that is used for a similar purpose.

In one embodiment, a system identifies a travel route of a vehicle. Based on the travel route, the system identifies a pattern of travel over a predetermined period of time (e.g., six hours in a day). To identify a pattern of travel, the system may identify a plurality of destination locations in the travel route, identify whether the time spent at one or more of the plurality of destination locations is shorter than a predetermined duration (e.g., five minutes or less), and detect whether the vehicle remains on while the vehicle is parked at one or more of the plurality of destination locations. Additionally, the system may receive occupancy data from a sensor indicating the presence of one or more occupants (excluding the driver) in the vehicle. In some embodiments, the system may receive data from one or more sensors indicating the presence of food or other items in the vehicle during the relevant time period. Based on the pattern of travel, the time spent at one or more of the plurality of destination locations being shorter than the predetermined duration and the vehicle remaining on while the vehicle is parked at one or more of the plurality of destination locations, the system may determine that the vehicle is being used as a private vehicle for an on-demand delivery service. Additionally, based on the system receiving occupancy data indicating that there are one or more other occupants in the vehicle besides the driver, the system may determine that the vehicle is being used for a ride-sharing service. In an embodiment in which a private vehicle is being used for an on-demand delivery service by its owner, the system may generate a notification to the driver (or owner) informing the driver of a location with a high volume of on-demand delivery requests. In other embodiments, the system may generate a notification to an employer informing the employer that the vehicle is being used for an on-demand delivery service. As another example, the system may generate a notification to an insurance company, informing the insurance company that the vehicle is being used for an on-demand delivery service.

Referring to FIG. 1, an example of a vehicle 100 is illustrated. As used herein, a "vehicle" is any form of powered transport. In some implementations, the vehicle 100 is an automobile. The vehicle may be manually driven, semi-autonomous or fully autonomous. While arrangements will be described herein with respect to automobiles, it will be understood that embodiments are not limited to automobiles. In some implementations, the vehicle 100 may be any robotic device or form of powered transport that, for example, includes one or more automated or autonomous systems, and thus benefits from the functionality discussed herein. In various embodiments, the automated/autonomous systems or combination of systems may vary. For example, in one aspect, the automated system is an advanced driving assistance system (ADAS) such as a collision prevention system, lane departure system, and so on. In a further aspect, the autonomous system is a system that provides autonomous control of the vehicle according to one or more levels of automation such as the levels defined by the Society of Automotive Engineers (SAE) (e.g., levels 0-5). As such, the autonomous system may provide semi-autonomous control or fully autonomous control as discussed in relation to the autonomous driving module 160.

The vehicle 100 includes a sensor system 120, a navigation system 147, an output system 135, and a vehicle usage notification system 170. The vehicle 100 also includes other elements, as shown in FIG. 1. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances and provided as remote services (e.g., cloud-computing services).

The sensor system 120 may include one or more sensors. "Sensor" means any device, component and/or system that can detect, determine, assess, monitor, measure, quantify and/or sense something. The one or more sensors can be configured to detect, determine, assess, monitor, measure, quantify and/or sense in real-time. As used herein, the term "real-time" means a level of processing responsiveness that a user or system senses as sufficiently immediate for a particular process or determination to be made or that enables the processor to keep up with some external process. In arrangements in which there are a plurality of sensors, the sensors can work independently from one another. Alternatively, two or more of the sensors can work in combination with one another. In such case, the two or more sensors can form a sensor network. The sensors can be operatively connected to the vehicle usage notification system 170 or other elements of the vehicle 100 (including any of the elements shown in FIG. 1). The sensors can include any suitable type of sensor. The sensors may be internal to the vehicle. Additionally or alternatively, some sensors such as cameras 129 may be external to the vehicle 100. As an example, cameras 129 mounted on roadside structures or buildings may record images of the vehicle 100 and passengers during a pick-up or drop-off, and may communicate the images to the sensor system 120.

Various examples of different types of sensors will be described herein. However, it will be understood that the embodiments are not limited to the particular sensors described.

The sensor system 120 may be configured to determine occupancy data relating to a cabin and/or a trunk of the vehicle 100. In other words, the sensor system 120 may detect what types of objects are in the cabin and/or the trunk of the vehicle 100. The sensor system 120 may detect that objects in the vehicle 100 are persons, animals, food items, and/or other items. The sensor system 120 may further detect how many of each object is in the vehicle 100. The sensor system 120 may determine occupancy data using one or a combination of various sensors. As an example, the sensor system 120 may include door handle touch sensors 126, weight sensors 127, seatbelt sensors 128, and cameras 129.

Accordingly, the sensor system 120 may include one or more door handle touch sensors 126. The door handle touch sensor 126 can be configured to detect when a vehicle door handle has been touched or moved (e.g., where the user lifts or pulls on the vehicle door handle). The door handle touch sensor 126 can be configured to sense whether a vehicle door is being opened from inside or outside of the vehicle 100 by detecting a movement of the vehicle door handle inside or outside of the vehicle 100, respectively. The sensor system 120 may detect at least one human passenger in the vehicle 100 when a vehicle door is opened from inside the vehicle 100 at a drop-off location. As another example, the sensor system 120 may detect at least one item (e.g., food or other item) in the cabin when the vehicle door is opened from the outside at a drop-off location. Further, the sensor system 120 may detect at least one item in the trunk when a vehicle trunk lid is opened. The door handle touch sensor 126 can be any suitable sensor. In one or more arrangements, the one or more door handle touch sensors 126 may be capacitive touch sensors or resistant touch sensors.

The sensor system 120 can include one or more weight sensors 127. The weight sensor 127 can be configured to detect the weight and/or the weight distribution of an object in the cabin or the trunk. A given weight sensor 127 may be located in a seat, a floor of the cabin, and/or a floor of the trunk. Based on the weight of the object, the sensor system 120 may distinguish between the object being a person or an item. Further, based on the weight distribution of the object (i.e., the size of the area over which the weight is distributed), the sensor system 120 may determine whether the object is a person or an item.

The sensor system 120 can include one or more seatbelt sensors 128. A given seatbelt sensor 128 can be configured to detect when a seatbelt is fastened or unfastened. Based on whether the seatbelt is fastened or unfastened, the sensor system 120 may distinguish between a detected object being a person or an item.

The sensor system 120 can include one or more cameras 129. A given camera 129 may acquire sensor data in various forms such as still images, video, point clouds, and so on. As an example, the camera 129 may acquire a video of the inside of the vehicle 100, which may include objects in the vehicle cabin. In one or more arrangements, the one or more cameras 129 can be high dynamic range (HDR) cameras or infrared (IR) cameras.

In one or more arrangements, the sensor system 120 may include artificial or computational intelligence elements, e.g., neural network, fuzzy logic, or other machine learning algorithms. As one example, the sensor system 120 may use machine learning techniques in which objects and their related attributes can be provided to a machine learning program for training the sensor system 120. As another example, the sensor system 120 may include an object identification database that identifies objects and their related attributes. In such an example, the sensor system 120 may compare the attributes received from the various sensors to attributes in the object identification database to identify an object. The sensor system 120 may use this object-identification capability to determine the occupancy status of the vehicle 100 at a pickup location (i.e., at an originating location). Additionally or alternatively, the sensor system 120 may determine occupancy status as the vehicle 100 is driving or being driven between a pickup location and a drop-off location or as the vehicle 100 is approaching a drop-off location (i.e., a destination location).

In one or more arrangements, the vehicle 100 may include a navigation system 147. The navigation system 147 can include one or more devices, components, or combinations thereof configured to determine the geographic location of the vehicle 100. The navigation system 147 can include one or more mapping applications and may have access to map data 116.

The navigation system 147 can include a global positioning system, a local positioning system, and/or a geolocation system. The navigation system 147 can be implemented with any one of a number of satellite positioning systems, such as the United States Global Positioning System (GPS), the Russian Glonass system, the European Galileo system, the Chinese Beidou system, etc. The navigation system 147 may include a transceiver configured to estimate or determine a position of the vehicle 100 with respect to the Earth. For example, the navigation system 147 can include a GPS transceiver to determine the vehicle's latitude, longitude, and altitude. The navigation system 147 can use other systems (e.g. laser-based localization systems, inertial-aided GPS, and/or camera-based localization) to determine the location of the vehicle 100.

The vehicle 100 can include an output system 135. An "output system" includes any device, component, arrangement, or group thereof that enables information/data to be presented to any interested entity (e.g., a driver, a vehicle passenger, a vehicle owner at a distant location, etc.). The output system 135 in the vehicle 100 may include a display unit to which it outputs information. Additionally or alternatively, the output system 135 can output information over one or more communication networks to which it is communicatively linked. As used herein, the term "communicatively linked" can include direct or indirect connections through a communication channel or pathway or another component or system.

A "communication network" means two or more nodes that transmit information to one another and/or receive information from one another. The embodiments described herein can include one or more communication networks. The one or more communication networks can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The communication network further can be implemented as or include one or more wireless networks, whether short or long range. For example, in terms of short range wireless networks, the communication network can include a local wireless network built using a Bluetooth or one of the IEEE 802 wireless communication protocols, e.g., 802.11a/b/g/i, 802.15, 802.16, 802.20, Wi-Fi Protected Access (WPA), or WPA2. In terms of long-range wireless networks, the communication network can include one or more of a mobile, cellular, and satellite-based wireless network and can support voice, video, text, or any combination thereof. Examples of long-range wireless networks include GSM, TDMA, CDMA, WCDMA networks, and the like. The one or more communication networks can include wired communication links and/or wireless communication links. The one or more communication networks can include any combination of the above networks or other types of networks. The one or more communication networks can include one or more routers, switches, access points, wireless access points, or the like.

Some of the possible elements of the vehicle 100 are shown in FIG. 1 and will be described along with subsequent figures. However, a description of many of the elements in FIG. 1 will be provided after the discussion of FIGS. 2-4 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. It should be understood that the embodiments described herein may be practiced using various combinations of these elements.

In an embodiment, the vehicle 100 includes a vehicle usage notification system 170 that determines whether the vehicle 100 is being used as a private vehicle for an on-demand delivery service, and, when the vehicle 100 is being used as a private vehicle for an on-demand delivery service, generates a notification to an entity associated with the vehicle 100. Though depicted as a standalone component, in one or more embodiments, the vehicle usage notification system 170 may be integrated with a component of the vehicle 100 such as the autonomous driving module 160 or another component of the vehicle 100. The noted functions and methods will become more apparent with a further discussion of the figures.

Figure 2:
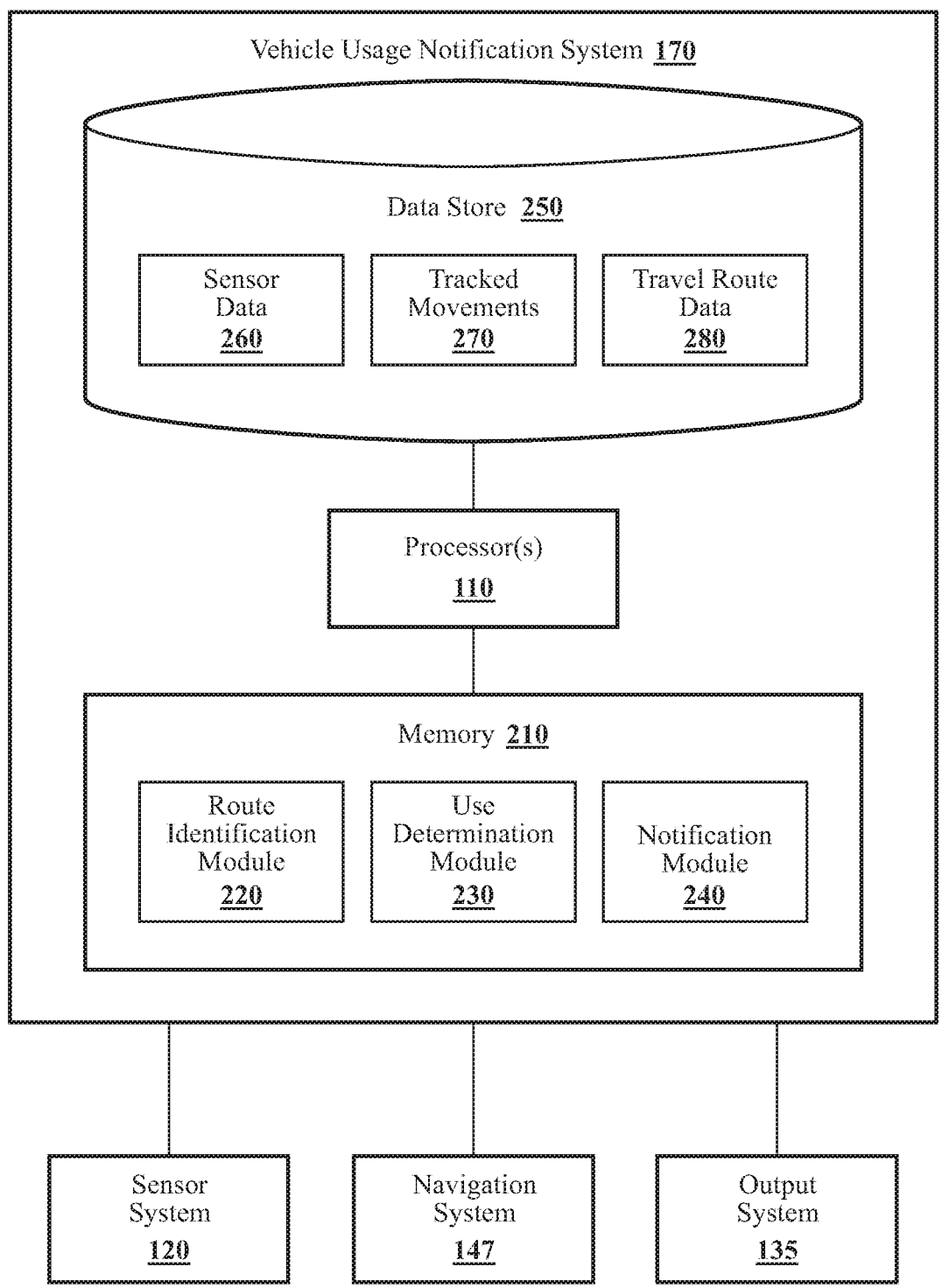
FIG. 2 illustrates one embodiment of a vehicle usage notification system that is associated with determining whether a vehicle is being used as a private vehicle for an on-demand delivery service.

With reference to FIG. 2, one embodiment of the vehicle usage notification system 170 is further illustrated. As shown, the vehicle usage notification system 170 includes a processor 110. Accordingly, the processor 110 may be a part of the vehicle usage notification system 170 or the vehicle usage notification system 170 may access the processor 110 through a data bus or another communication path. In one or more embodiments, the processor 110 is an application specific integrated circuit (ASIC) that is configured to implement functions associated with a route identification module 220, a use determination module 230, and a notification module 240. In general, the processor 110 is an electronic processor such as a microprocessor that is capable of performing various functions as described herein.

In one embodiment, the vehicle usage notification system 170 includes a memory 210 that is communicably coupled to the processor 110. The memory 210 stores the route identification module 220, a use determination module 230, and a notification module 240. The memory 210 is a random-access memory (RAM), read-only memory (ROM), a hard disk drive, a flash memory, or other suitable memory for storing the modules 220, 230, and 240. The modules 220, 230, and 240 are, for example, computer-readable instructions that when executed by the processor 110 cause the processor 110 to perform the various functions disclosed herein.

Furthermore, in one embodiment, the vehicle usage notification system 170 may include a data store 115. The data store 115 may be a component of the vehicle usage notification system 170, the processor(s) 110, or both. Alternatively, the data store 115 may be a component of the vehicle 100, as shown FIG. 1, and can be operatively connected to the vehicle usage notification system 170 or the processor(s) 110. The term "operatively connected," as used throughout this description, can include direct or indirect connections, including connections without direct physical contact.

In one embodiment, the data store 115 may be an electronic data structure such as a database that is stored in the memory 210 or another memory and that is configured with routines that can be executed by the processor 110 for analyzing stored data, providing stored data, organizing stored data, and so on. Thus, in one embodiment, the data store 115 stores data used by the modules 220, 230 and 240 in executing various functions. In one embodiment, the data store 115 includes sensor data 260, tracked movement 270, and travel route data 280 along with, for example, other information that is used by the modules 220, 230 and 240.

The sensor system 120 forms the sensor data 260, and the sensor data 260 includes the occupancy data. The occupancy data as described above includes the type and number of objects detected in the vehicle 100.

The navigation system 147 stores the tracked movement 270. The tracked movement 270 include a plurality of locations where the vehicle 100 has traveled and, for at least one or more of the plurality of locations, associated timestamps indicating when the vehicle 100 was at the applicable locations.

The route identification module 220 generally includes instructions that when executed by the one or more processors 110 cause the one or more processors 110 to perform functions described in detail below. The route identification module 220 may identify a travel route of the vehicle 100 based on at least the tracked movement of the vehicle 100. As an example, the route identification module 220 may acquire the tracked movement 270 of the vehicle 100 from the navigation system 147. Based on the tracked movement 270, the route identification module 220 may determine the travel route of the vehicle 100.

The route of travel may include the plurality of locations mentioned above (e.g., based on geographic co-ordinates or mapping data) related in time, an associated route, an associated speed of travel between at least one or more of the plurality of locations, the associated time stamps, and an associated time period spent at at least one or more of the plurality of locations. Data relating to the routes of travel may be stored as travel route data 280 in the data store 115. Travel route data 280 may include data from one driving session, where a "driving session" is when the vehicle 100 has been in motion without any stops that exceed a predetermined duration. Table 1 below provides an example of one driving session, where the predetermined duration is 9 minutes.

TABLE 1

| Origin (Pick-up Location) | Time Stamp (Arrival Time at Origin) | Time Period (Time Spent at Origin) | Destination (Drop-off Location) | Time Stamp (Arrival Time at Destination) | Time Period (Time Spent at Destination) |
|---|---|---|---|---|---|
| A1 | 5:12 p.m. | 4 minutes | A2 | 5:35 p.m. | 42 seconds |
| B1 | 5:45 p.m. | 2 minutes | B2 | 6:04 p.m. | 55 seconds |
| C1 | 6:23 p.m. | 3 minutes | C2 | 6:47 p.m. | 22 seconds |
| D1 | 7:06 p.m. | 7 minutes | D2 | 7:24 p.m. | 4 minutes |
| E1 | 7:31 p.m. | 2 minutes | E2 | 7:40 p.m. | 52 seconds |
| F1 | 7:45 p.m. | 3 minutes | F2 | 7:58 p.m. | 49 seconds |
| G1 | 7:58 p.m. | 4 minutes | G2 | 8:15 p.m. | 1 minute |
| H1 | 8:21 p.m. | 1 minute | H2 | 8:36 p.m. | 37 seconds |

Travel route data 280 may further include data from a plurality of driving sessions. The driving sessions may be on a single day. Alternatively, the driving sessions may be on a plurality of days.

The use determination module 230 generally includes instructions that when executed by the one or more processors 110 cause the one or more processors 110 to perform functions described in detail below. The use determination module 230 may identify a pattern of travel based on a travel route over a predetermined period of time and may determine whether the vehicle 100 is being used as a private vehicle for an on-demand delivery service based on the pattern of travel. The use determination module 230 may determine that the vehicle 100 is being used for on-demand delivery services by identifying characteristics in the pattern of travel that are sometimes associated with vehicles used for on-demand delivery services. One example of such a characteristic is a brief time period (e.g., less than five minutes) spent at an originating or destination location. Another example is the vehicle 100 remaining on (e.g., its engine running) while the vehicle 100 is stopped. Another example is a vehicle 100 traveling in a holding pattern. In other words, the travel route of the vehicle 100 may be a loop as a driver of the vehicle circles an area, waiting for a service request.

In one embodiment, the use determination module 230 may identify the pattern of travel based on the travel route over the predetermined period of time by performing one or more of the following: (1) identify a plurality of destination locations in the travel route; (2) identify whether a time spent at one or more of the plurality of destination locations is shorter than a predetermined duration; and (3) detect whether the vehicle 100 remains on while the vehicle 100 is parked at one or more of the plurality of destination locations.

An originating location is a location at which the vehicle 100 is stopped for a pickup and a destination location is a location at which the vehicle 100 is stopped for a drop-off. The pick-up may be the pick-up of a person, an item, food, or a combination thereof. Similarly, the drop-off may be the drop-off of a person, an item, food, or a combination thereof. The use determination module 230 may distinguish between a vehicle 100 stopped at a traffic sign (e.g., a red light, a stop sign, a yield sign) and a vehicle 100 stopped at an originating location or destination location, based on the position of the vehicle 100 on a road. In other words, the use determination module 230 may identify each of a plurality of originating locations or destination locations based on factors such as identifying that the vehicle 100 is stopped for a time period that is shorter than a predetermined duration on the shoulder of a street or in a driveway of a building (such as a school or a residence).

The use determination module 230 may receive the time spent at one or more of the plurality of the originating locations, destination locations, or both from the travel route data. The use determination module 230 may receive the time spent for at least two of the plurality of originating locations or destination locations. The use determination module 230 may include a predetermined duration that defines a maximum time permitted during a stop at the originating location or the destination location. The predetermined duration may be set to an arbitrary value based on an average waiting time. The use determination module 230 may compare the associated time spent at one or more of the plurality of the originating locations or destination locations with the predetermined duration and determine whether each of the associated time spent is shorter than the predetermined duration.

In one embodiment, the use determination module 230 may detect whether the vehicle 100 remains on while the vehicle 100 is parked at one or more of the plurality of destination locations by requesting a status update from a related vehicle system 140 such as the transmission system 145 or from a related vehicle sensor.

In one embodiment, the use determination module 230 may determine, when the time spent at one or more of the plurality of destination locations is shorter than the predetermined duration and the vehicle 100 remains on while the vehicle 100 is parked at one or more of the plurality of destination locations, that the vehicle 100 is being used as a private vehicle for an on-demand delivery service.

In one embodiment, the use determination module 230 may (i) identify an originating location and a plurality of destination locations in the travel route, (ii) identify that the vehicle 100 travels to the originating location, (iii) identify that the vehicle 100 then travels to at least a first one of the plurality of destination locations, (iv) identify that the vehicle 100 then returns to the originating location, and (v) identify that the vehicle 100 then travels to at least a second one of the plurality of destination locations. The use determination module 230 may determine, based at least in part, on factors such as (i)-(v) as listed above, that the vehicle 100 is being used as a private vehicle for an on-demand delivery service.

As an example, the pattern of travel of the vehicle 100 used for on-demand delivery service may include a travel route where the vehicle 100 starts at an originating location, picking up a first passenger, dropping off the first passenger at a first destination location, returning to the originating location, picking up a second passenger, dropping off the second passenger at a second destination location, returning to the originating location, and so on. The originating location may be a place of interest such as an airport or a concert venue.

In other embodiments, the pattern of usage might be different from (i)-(v) above. In one such embodiment, the use determination module 230 may (i) identify a plurality of originating locations and a plurality of destination locations in the travel route, (ii) identify that the vehicle 100 travels to at least a first one of the plurality of the originating locations, (iii) identify that the vehicle 100 then travels to at least a first one of the plurality of destination locations, (iv) identify that the vehicle 100 then travels to at least a second one of the plurality of originating locations, and (v) identify that the vehicle 100 then travels to at least a second one of the plurality of destination locations. The use determination module 230 may determine, based at least in part, on factors such as (i)-(v) as listed above, that the vehicle 100 is being used as a private vehicle for an on-demand delivery service. As an example, the vehicle 100 might begin a route at the first one of the originating locations but not return to that location after visiting each destination location. Instead, vehicle 100 might proceed to visit a series of distinct originating and destination locations (e.g., ride-sharing pickup and drop-off locations) serially.

As described above, the use determination module 230 may identify originating and destination locations. Based on the associated travel route, the use determination module 230 may identify the vehicle 100 traveling between the plurality of originating locations and the plurality of destination locations.

Upon identifying that the vehicle 100 is traveling from the originating location to the at least a first of the destination locations, returning to the originating location and then traveling to at least a second of the destination locations, the use determination module 230 may determine that the vehicle 100 is being used for the on-demand delivery service.

The first of the destination locations may be a different location from the second of the destination locations. Alternatively, the first of the destination locations may be the same location as the second of the destination locations. As an example, a vehicle 100 being used for ride-sharing services may be shuttling passengers from an airport to a nearby hotel. In such a case, there is one originating location and one destination location.

In one embodiment, the use determination module 230 may identify whether the travel route is a holding pattern. The use determination module 230 may identify the travel route of the vehicle 100 as a holding pattern when the route is a loop and does not include stops for drop-off or pickup. In such an embodiment, the instructions to determine whether the vehicle 100 is being used as a private vehicle for an on-demand delivery service may include determining, when the travel route is a holding pattern, that the vehicle 100 is being used as a private vehicle for an on-demand delivery service. Accordingly, upon identifying that the travel route is a holding pattern, the use determination module 230 may determine that the vehicle 100 is being used for on-demand delivery services.

In one embodiment, the use determination module 230 may identify the pattern of travel based on a travel route over a predetermined period of time by identifying whether the originating location is a place of interest. In another embodiment, the use determination module 230 may identify whether the originating location is a restaurant. The use determination module 230 may receive places of interest associated with a location from the map data 116 in the data store 115. Alternatively, the use determination module 230 may receive places of interest associated with a location from the navigation system 147. Places of interest may include any location that many people tend to visit often such as museums, concert halls, art centers, universities, stadiums, and businesses, including restaurants.

In one embodiment, the instructions in the use determination module 230 to determine whether the vehicle is being used as a private vehicle for an on-demand delivery service may include determining that the originating location is a place of interest and that the occupancy data is indicative of at least one passenger in the vehicle. Specifically, such a usage pattern is indicative of the vehicle 100 being used for a ride-sharing service.

In one embodiment, the instructions to determine whether the vehicle 100 is being used as a private vehicle for an on-demand delivery service may include determining, when the originating location is a restaurant and the occupancy data is indicative of at least one food item, that the on-demand delivery service is a food delivery service. In such a case, when the use determination module 230 determines that the originating location is associated with a place of interest, specifically, a restaurant, and that the occupancy data indicates at least one food item in the vehicle, the use determination module 230 may determine that the vehicle 100 is being used for a food delivery service. Alternatively, if the occupancy data indicates at least one passenger as well as at least one food item, the use determination module 230 may determine the vehicle is being used for ride-sharing, food delivery or both.

Further, the use determination module 230 may generally further include instructions that when executed by the one or more processors 110 cause the one or more processors 110 to receive the occupancy data from the sensor system 120 pertaining to times when the vehicle 100 was approaching one or more of the plurality of destination locations. The use determination module 230 may receive the occupancy data from the sensor data 260 in the data store 115. The occupancy data applies to occupants of a manually driven vehicle 100 other than the driver. In other words, as an example, the occupancy data indicating one passenger in a manual vehicle 100 may mean one human driver and one human passenger. Alternatively, in an example where the vehicle 100 is autonomous, the occupancy data indicating one passenger may mean no human driver and one human passenger.

In one embodiment, when the use determination module 230 determines that the vehicle 100 is being used as a private vehicle for an on-demand delivery service and the use determination module 230 receives occupancy data indicating that at least one passenger in the vehicle, the use determination module 230 may determine that the vehicle 100 is being used for a ride-sharing service.

In one embodiment, when the use determination module 230 determines that the vehicle 100 is being used as a private vehicle for an on-demand delivery service and the use determination module 230 receives occupancy data indicating that at least one item in the vehicle 100, the use determination module 230 may determine that the vehicle 100 is being used for an item delivery service.

In one embodiment, when the use determination module 230 determines that the vehicle 100 is being used as a private vehicle for an on-demand delivery service and the use determination module 230 receives occupancy data indicating that at least one food item in the vehicle, the use determination module 230 may determine that the vehicle 100 is being used for a food delivery service.

In a case where the occupancy data indicates at least one passenger and at least one of an item and a food item, the use determination module 230 may determine that the vehicle 100 is being used for a ride-sharing service. Alternatively, in such an example, the use determination module 230 may determine that the vehicle 100 is being used for a ride-sharing service and at least one of an item delivery service and a food delivery service. The use determination module 230 may use additional information such as the originating location, destination location, sensor data or any suitable additional information to further determine what type of on-demand delivery service the vehicle is being used for.

The notification module 240 generally includes instructions that when executed by the one or more processors 110 cause the one or more processors 110 to perform the functions described in detail below. When the vehicle 100 is being used as a private vehicle for the on-demand delivery service, the notification module 240 may generate a notification to an entity associated with the vehicle 100, wherein the notification includes information relating to the vehicle 100 being used as a private vehicle for the on-demand delivery service.

The entity associated with the vehicle 100 includes any entity that may have a relationship with the vehicle 100 such as an entity that owns the vehicle 100 (e.g., personal vehicle owner, company vehicle owner), an entity that leases out the vehicle 100 (e.g., car rental company), and an entity that insures the vehicle 100 (e.g., an insurance company).

The notification may be transmitted to the entity associated with vehicle 100 via the communication network. In such a case, the notification may be transmitted to a server associated with the entity. Alternatively, the notification may be transmitted to the entity via a cellular device.

In one embodiment, the notification may include a message indicating that the vehicle 100 is being used for the on-demand delivery service. In a case where the use determination module 230 identified that the on-demand delivery service is a ride-sharing service, an item delivery service or a food delivery service, the notification may further include a message specifying a type of on-demand delivery service. The notification may include a date, a time, and an associated travel route. In another embodiment, the notification may include information to inform the driver of the vehicle 100 of opportunities related to on-demand delivery services such as advertisements for on-demand delivery service companies currently hiring drivers, advertisements for insurance companies offering insurance for vehicles being used for on-demand delivery services, or information on places of interest that currently have a high demand for on-demand delivery services.

Figure 3A:
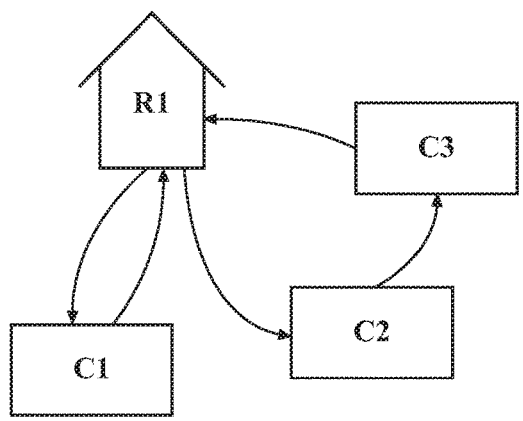
FIGS. 3A-3F illustrate example scenarios where the disclosed approach may determine whether the vehicle is being used as a private vehicle for an on-demand delivery service.

FIGS. 3A-3F illustrate example scenarios involving patterns of travel that may be used to determine that a vehicle 100 is being used as a private vehicle for an on-demand delivery service. FIG. 3A illustrates a travel route that originates at a restaurant R1, the vehicle 100 then travels to a first customer C1, returns to the restaurant R1, travels to a second customer C2 and a third customer C3, then returns to the restaurant R1. In this example, the use determination module 230 may identify the originating location and a plurality of destination locations as detailed above. The use determination module 230 may further identify that the originating location is a restaurant and that each of the plurality of the destination locations is, as an example, a residential home. Based on the aforementioned identifications and further identifying that the travel route includes the vehicle 100 returning to the restaurant, the use determination module 230 may determine that the vehicle 100 is being used as a private vehicle for the on-demand delivery service, specifically a food service delivery.

Figure 3B:
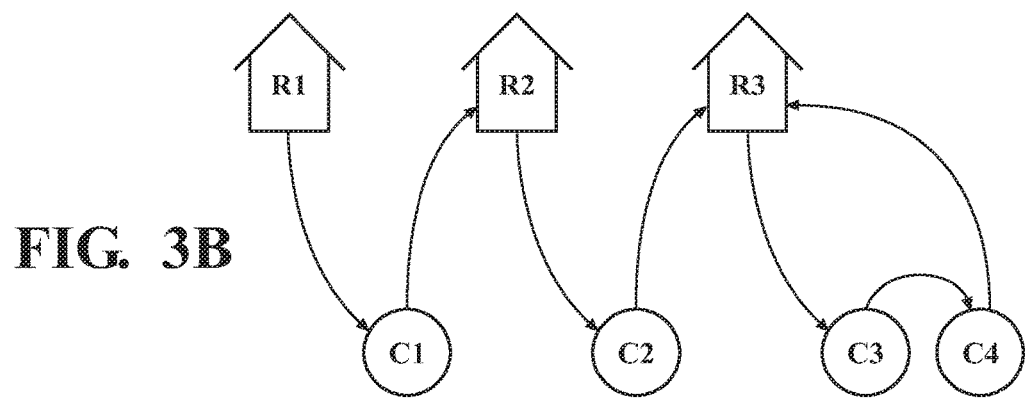

FIG. 3B illustrates a travel route that originates at a restaurant R1, then the vehicle 100 travels to a first customer C1, travels to a restaurant R2, travels to a second customer C2, travels to a restaurant R3, travels to a third customer C3 and a fourth customer C4, then returns to the restaurant R3. In this example, the use determination module 230 may identify a plurality of originating locations and a plurality of destination locations as detailed above. The use determination module 230 may further identify that the each of the plurality of originating locations is a restaurant and each of the plurality of destination locations is a non-restaurant location, e.g., a school, a residence, and an office. Based on the aforementioned identifications and further identifying that the travel route includes the vehicle 100 returning to one of three identified restaurants, the use determination module 230 may determine that the vehicle 100 is being used as a private vehicle for the on-demand delivery service, specifically a food service delivery.

Figure 3C:
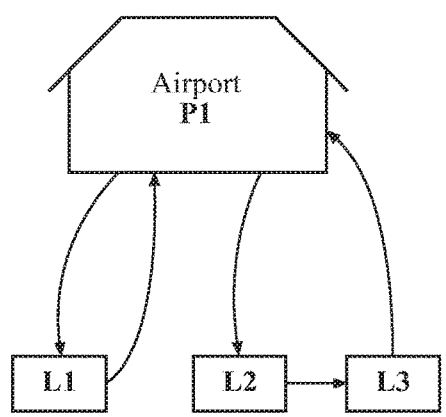

FIG. 3C illustrates a travel route that originates at a place of interest P1 (e.g., an airport, a concert hall), the vehicle 100 travels to a first location L1, returns to the place of interest P1, travels to a second location L2, travels to a third location L3, then returns to the place of interest P1. In this example, the use determination module 230 may identify an originating location and a plurality of destination locations as detailed above. The use determination module 230 may further identify that the each of the originating locations is a place of interest and one or more of the plurality of destination locations are, as an example, one of a hotel, a school, a residence, and office. Based on the aforementioned identifications and further identifying that the travel route includes the vehicle 100 returning to a location identified as a place of interest, specifically an airport, the use determination module 230 may determine that the vehicle 100 is being used as a private vehicle for the on-demand delivery service, specifically a ride-sharing service.

Figure 3D:
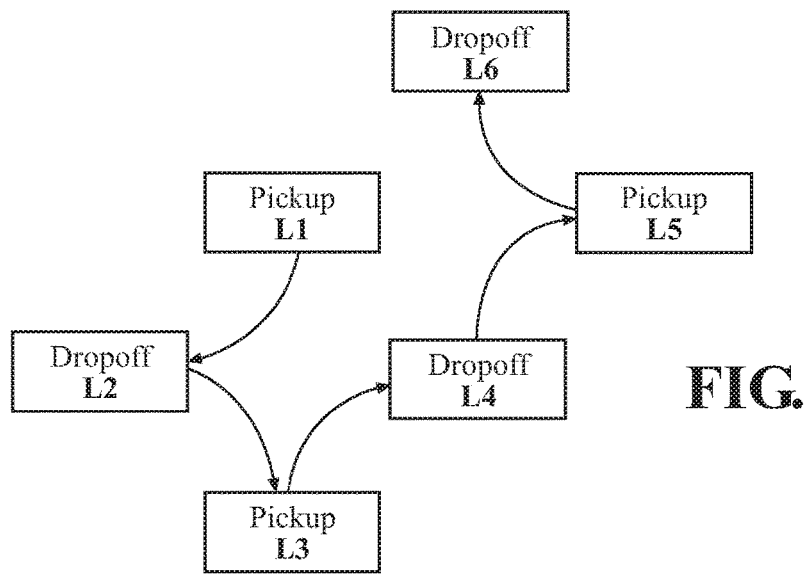

FIG. 3D illustrates a travel route that originates at a first location L1, the vehicle 100 then travels to a second location L2, a third location L3, a fourth location L4, a fifth location L5, and a sixth location L6. In this example, the use determination module 230 may identify the locations as at least one of a plurality of originating locations and the destination locations. Further, the use determination module 230 may determine that a time spent at some of the locations is shorter than a predetermined duration, e.g., five minutes, and may detect that the vehicle 100 remains on while the vehicle 100 is parked at some of the locations. Based on the aforementioned identifications and determinations, and upon receiving occupancy data indicating at least one passenger in the vehicle 100 as the vehicle 100 travels from the first location L1 (to pick up) to the second location L2 (to drop off), from the third location L3 (to pick up) to the fourth location L4 (to drop off), and from the fifth location L5 (to pick up) to the sixth location (to drop off), the use determination module 230 may determine that the vehicle 100 is being used as a private vehicle for the on-demand delivery service, specifically a ride-sharing service.

Figure 3E:
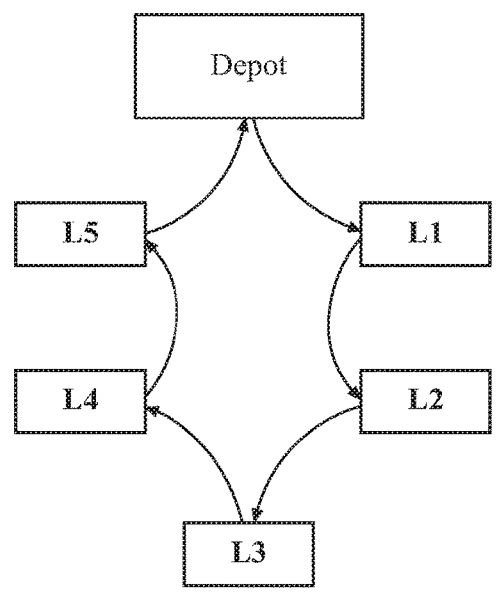

FIG. 3E illustrates a travel route that originates at a package depot, travels to a first location L1, a second location L2, a third location L3, a fourth location L4, and a fifth location L5. In this example, the use determination module 230 may identify an originating location and a plurality of destination locations as detailed above, e.g. based on time spent at the location and whether the location can be identified as a point of interest and a package depot. The use determination module 230 may further identify that some of the plurality of destination locations are, as an example, one of a hotel, a school, a residence, and office. Based on the aforementioned identifications, identifying that the travel route appears to follow a delivery route and receiving occupancy data indicating at least one item in the vehicle 100, the use determination module 230 may determine that the vehicle 100 is being used as a private vehicle for the on-demand delivery service, specifically an item (e.g., parcel) delivery service.

Figure 3F:
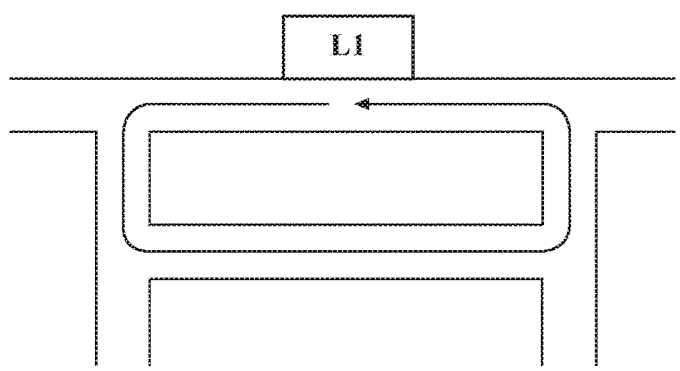

FIG. 3F illustrates a travel route that originates at a first location L1, the vehicle 100 travels in a loop without stopping at any identified destination location and returns to the first location L1. In this example, the use determination module 230 may identify an originating location as a location that the vehicle 100 stops at or travels slowly past, and as a location identified as a place of interest such as an airport. The use determination module 230 may determine that there is no destination location as the vehicle 100 does not make any stops, other than for traffic signals and the identified originating location. Based on the aforementioned identifications, identifying that the travel route includes the vehicle 100 returning to a location identified as a place of interest, specifically an airport, the use determination module 230 may determine that the vehicle 100 is traveling in a holding pattern and the vehicle 100 is being used as a private vehicle for the on-demand delivery service. The use determination module 230 may further determine the vehicle 100 is being used specifically for a ride-sharing service when the occupancy data indicates at least one passenger in the vehicle 100, for a food delivery service when the occupancy data indicates at least one food item in the vehicle 100, and for an item delivery service when the occupancy data indicates at least an item in the vehicle 100.

Although some examples show the travel route ending at the originating location, the travel route does not have to end at the originating location for the use determination module 230 to identify a pattern of travel that may be used to determine that the vehicle 100 is being used for the on-demand delivery service.

Figure 4:
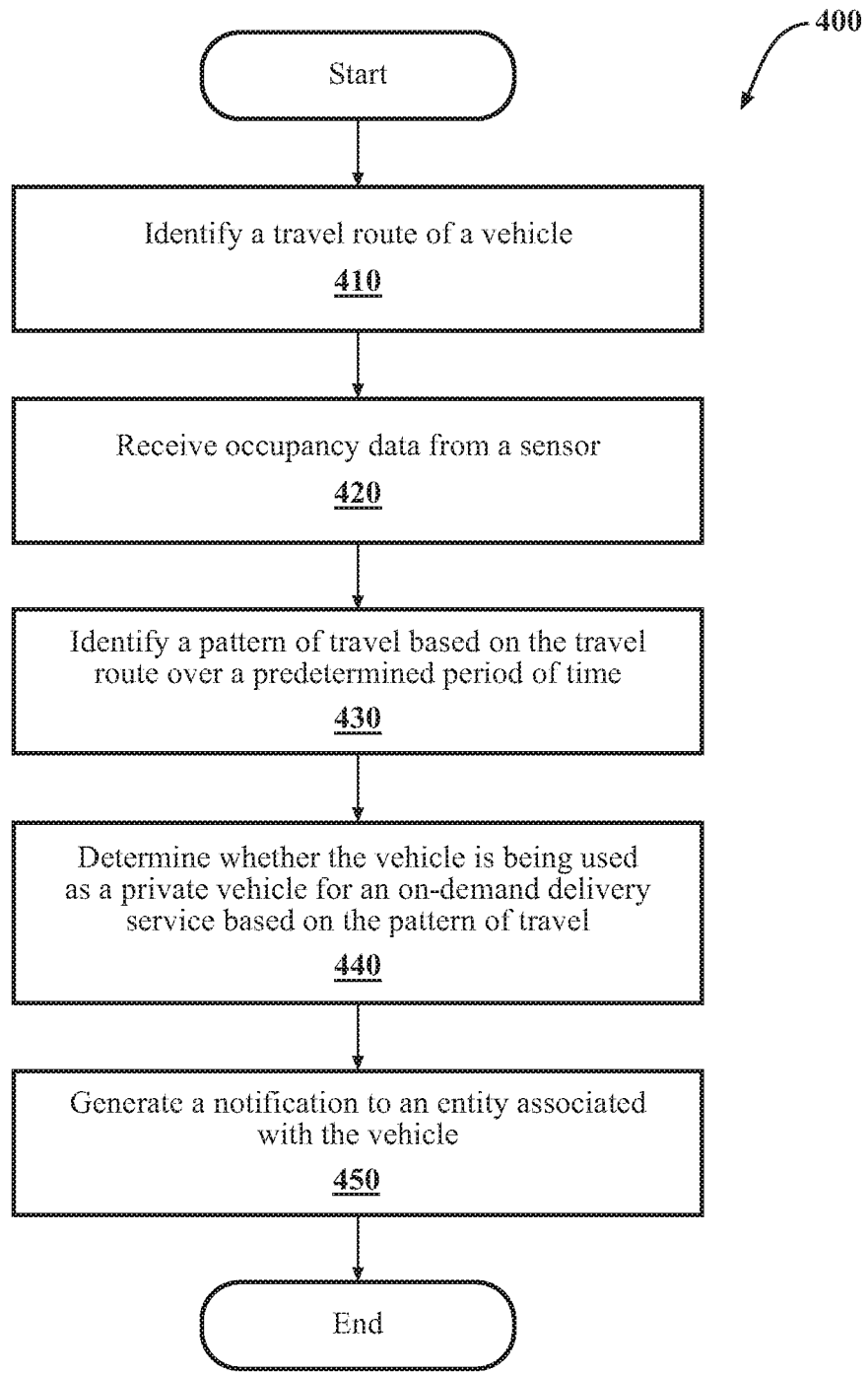
FIG. 4 is a flowchart illustrating one embodiment of a method associated with determining whether a vehicle is being used as a private vehicle for an on-demand delivery service.

FIG. 4 illustrates a flowchart of a method 400 that is associated with determining vehicle usage. Method 400 will be discussed from the perspective of the vehicle usage notification system 170 of FIGS. 1-2. While method 400 is discussed in combination with the vehicle usage notification system 170, it should be appreciated that the method 400 is not limited to being implemented within the vehicle usage notification system 170 but is instead one example of a system that may implement the method 400.

At 410, the route identification module 220 identifies a travel route of a vehicle. In one embodiment, the route identification module 220 identifies each location the vehicle 100 passes or travels to. The route identification module 220 may record, as an example, a time when the vehicle 100 was at each location and a time spent at each location. The route identification module 220 may store the data 280 relating to the travel route of the vehicle 100 in the data store 115.

At 420, the use determination module 230 may receive occupancy data from a sensor. As previously mentioned, the sensor may be internal to the vehicle 100, or alternatively the sensor 128 may be external to the vehicle 100. The use determination module 230 may receive occupancy data from the sensor 120 at various periods along the travel route. As an example, the use determination module 230 may receive occupancy data as the vehicle 100 leaves an originating location. In such a case, the use determination module 230 may request and receive occupancy data from the data store 115, in response to receiving a signal from a vehicle motion sensor, indicating the vehicle 100 has started moving. As another example, the use determination module 230 may receive occupancy data as the vehicle 100 travels along the travel route. In other words, the use determination module 230 may receive occupancy data between the originating location and a destination location. In such a case, the use determination module 230 may continually poll the data store 115, requesting occupancy data. Alternatively, the use determination module 230 may request occupancy at an arbitrary time period after the vehicle 100 is in motion. In another example, the use determination module 230 may receive occupancy data as the vehicle 100 approaches the destination location. In such a case, the use determination module 230 may request occupancy data from the data store 115 in response to receiving a signal from a vehicle motion sensor, indicating the vehicle 100 slowing down or stopping.

At 430, the use determination module 230 identifies a pattern of travel based on the travel route over a predetermined period of time. In one embodiment, to identify the pattern of travel, the use determination module 230 may identify a plurality of destination locations in the travel route and whether a time spent at one or more of the plurality of destination locations is shorter than a predetermined duration. The use determination module 230 may detect whether the vehicle 100 remains on while the vehicle 100 is parked at one or more of the plurality of destination locations. In one embodiment, to identify the pattern of travel, the use determination module 230 may identify an originating location and the plurality of destination locations in the travel route, that the vehicle 100 travels to the originating location, that the vehicle 100 then travels to at least a first one of the plurality of destination locations, that the vehicle 100 then returns to the originating location, and that the vehicle 100 then travels to at least a second one of the plurality of destination locations.

In one embodiment, to identify the pattern of travel, the use determination module 230 may identify whether the originating location is a place of interest. Further, the use determination module 230 may identify whether the originating location is a restaurant. In another embodiment, the use determination module 230 may identify whether the travel route is a holding pattern.

To further identify a pattern of travel, the use determination module 230 may compare driving sessions from a plurality of days. As an example, if the use determination module 230 recorded a driving session where the vehicle 100 was being used for on-demand delivery in a same location on a same day of a week, the use determination module 230 may identify a pattern of travel.

At 440, the use determination module 230 determines whether the vehicle 100 is being used as a private vehicle for an on-demand delivery service based on the pattern of travel. In one embodiment, the use determination module 230 determines, when the time spent at one or more of the plurality of destination locations is shorter than the predetermined duration and the vehicle 100 remains on while the vehicle 100 is parked at one or more of the plurality of destination locations, that the vehicle 100 is being used as a private vehicle for an on-demand delivery service.

In one embodiment, upon identifying an originating location and a plurality of destination locations in the travel route, that the vehicle 100 travels to the originating location, that the vehicle 100 then travels to at least a first one of the plurality of destination locations, identifying that the vehicle 100 then returns to the originating location, and that the vehicle 100 then travels to at least a second one of the plurality of destination locations, the use determination module 230 determines that the vehicle 100 is being used for the on-demand delivery service.

In one embodiment, upon identifying a plurality of originating locations and a plurality of destination locations in the travel route, that the vehicle 100 travels to at least a first one of the plurality of originating locations, that the vehicle 100 then travels to at least a first one of the plurality of destination locations, identifying that the vehicle 100 travels to at least a second one of the plurality of originating locations, and that the vehicle 100 then travels to at least a second one of the plurality of destination locations, the use determination module 230 determines that the vehicle 100 is being used for the on-demand delivery service.

In one embodiment, when the travel route is the holding pattern, the use determination module 230 may determine that the vehicle 100 is being used as a private vehicle for an on-demand delivery service.

The use determination module 230 may determine, when the vehicle 100 is being used as a private vehicle for an on-demand delivery service and the occupancy data is indicative of at least one passenger, that the on-demand delivery service is a ride-sharing service. Further, the use determination module 230 may determine, when the vehicle 100 is being used as a private vehicle for an on-demand delivery service, the originating location is the place of interest and the occupancy data is indicative of at least one passenger, that the on-demand delivery service is a ride-sharing service.

The use determination module 230 may determine, when the vehicle 100 is being used as a private vehicle for an on-demand delivery service and the occupancy data is indicative of at least one item, that the on-demand delivery service is an item delivery service.

The use determination module 230 may determine, when the vehicle 100 is being used as a private vehicle for an on-demand delivery service and the occupancy data is indicative of at least one food item, that the on-demand delivery service is a food delivery service. Further, the use determination module 230 may determine, when the vehicle 100 is being used as a private vehicle for an on-demand delivery service, the originating location is a restaurant and the occupancy data is indicative of at least one food item, that the on-demand delivery service is a food delivery service.

At 450, the notification module 240 generates, when the vehicle 100 is being used as a private vehicle for an on-demand delivery service, a notification to an entity associated with the vehicle 100, wherein the notification includes information relating to the vehicle 100 being used as a private vehicle for an on-demand delivery service.

In a case where the use determination module 230 determines that the on-demand delivery service is at least one of the ride-sharing service, the item delivery service and the food delivery service, the notification module 240 may include an indicator of a type of on-demand delivery service in the notification to the entity.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner. "Manual mode" means that all of or a majority of the navigation and/or maneuvering of the vehicle 100 is performed according to inputs received from a user (e.g., human driver).

In one or more arrangements, the vehicle 100 can be a conventional vehicle that is configured to operate in only a manual mode. In one or more embodiments, the vehicle 100 can be an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle 100 to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component, or system that can detect or sense something. The one or more sensors can be configured to detect or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, or sense information about the vehicle 100 itself. In one or more arrangements, the vehicle sensor(s) 121 can be configured to detect, or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, or other suitable sensors. The vehicle sensor(s) 121 can be configured to detect or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire or sense driving environment data. "Driving environment data" includes data or information about the external environment in which an autonomous vehicle is located or one or more portions thereof. For example, the one or more environment sensors 122 can be configured to detect, quantify, or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 129. In one or more arrangements, the one or more cameras 129 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data 116.

The autonomous driving module(s) 160 either independently or in combination with the vehicle systems 140 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 260. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A method for determining vehicle usage, the method comprising:
    identifying a travel route of a vehicle using a navigation system;
    identifying a pattern of travel based on the travel route over a predetermined period of time, wherein identifying the pattern of travel based on the travel route over the predetermined period of time includes:
        identifying a plurality of destination locations in the travel route; and
        identifying whether a time spent at one or more of the plurality of destination locations is shorter than a predetermined duration;
    determining whether the vehicle is being used as a private vehicle for an on-demand delivery service based on the pattern of travel; and
    when the vehicle is being used as a private vehicle for an on-demand delivery service, generating a notification to an entity associated with the vehicle, wherein the notification includes information relating to the vehicle being used as a private vehicle for an on-demand delivery service.

2. The method of claim 1, wherein identifying the pattern of travel based on the travel route over the predetermined period of time includes:
    detecting whether the vehicle remains on while the vehicle is at one or more of the plurality of destination locations; and
    wherein determining whether the vehicle is being used as a private vehicle for an on-demand delivery service includes:
        determining, when the time spent at one or more of the plurality of destination locations is shorter than the predetermined duration and the vehicle remains on while the vehicle is at one or more of the plurality of destination locations, that the vehicle is being used as a private vehicle for an on-demand delivery service.

3. The method of claim 2, further comprising receiving occupancy data from a sensor as the vehicle is approaching one or more of the plurality of destination locations; and
    wherein determining whether the vehicle is being used as a private vehicle for an on-demand delivery service includes:
        determining, when the vehicle is being used as a private vehicle for an on-demand delivery service and the occupancy data is indicative of at least one passenger, that the on-demand delivery service is a ride-sharing service.

4. The method of claim 2, further comprising receiving occupancy data from a sensor as the vehicle approaches one or more of the plurality of destination locations; and
    wherein determining whether the vehicle is being used as a private vehicle for an on-demand delivery service includes:
        determining, when the vehicle is being used as a private vehicle for an on-demand delivery service and the occupancy data is indicative of at least one item, that the on-demand delivery service is an item delivery service.

5. The method of claim 2, further comprising receiving occupancy data from a sensor as the vehicle approaches one or more of the plurality of destination locations; and
    wherein determining whether the vehicle is being used as a private vehicle for an on-demand delivery service includes:
        determining, when the vehicle is being used as a private vehicle for an on-demand delivery service and the occupancy data is indicative of at least one food item, that the on-demand delivery service is a food delivery service.

6. The method of claim 1, wherein identifying the pattern of travel based on the travel route over the predetermined period of time includes:
    (i) identifying an originating location and a plurality of destination locations in the travel route;
    (ii) identifying that the vehicle travels to the originating location;
    (iii) identifying that the vehicle then travels to at least a first one of the plurality of destination locations;
    (iv) identifying that the vehicle then returns to the originating location; and
    (v) identifying that the vehicle then travels to at least a second one of the plurality of destination locations; and
    wherein determining whether the vehicle is being used as a private vehicle for an on-demand delivery service includes:
        determining, based at least on (i)-(v), that the vehicle is being used as a private vehicle for an on-demand delivery service.

7. The method of claim 6, further comprising receiving occupancy data from a sensor as the vehicle leaves the originating location;
    wherein identifying the pattern of travel based on the travel route over the predetermined period of time includes:
        identifying whether the originating location is a restaurant; and wherein determining whether the vehicle is being used as a private vehicle for an on-demand delivery service includes:
determining, when the vehicle is being used as a private vehicle for an on-demand delivery service, the originating location is a restaurant and the occupancy data is indicative of at least one food item, that the on-demand delivery service is a food delivery service.

8. The method of claim 6, further comprising receiving occupancy data from a sensor as the vehicle travels along the travel route;
wherein identifying the pattern of travel based on the travel route over the predetermined period of time includes:
identifying whether the originating location is a place of interest; and
wherein determining whether the vehicle is being used as a private vehicle for an on-demand delivery service includes:
determining, when the vehicle is being used as a private vehicle for an on-demand delivery service, the originating location is the place of interest and the occupancy data is indicative of at least one passenger, that the on-demand delivery service is a ride-sharing service.

9. The method of claim 1, wherein identifying the pattern of travel based on the travel route over the predetermined period of time includes:
(i) identifying a plurality of originating locations and a plurality of destination locations in the travel route;
(ii) identifying that the vehicle travels to at least a first one of the plurality of originating locations;
(iii) identifying that the vehicle then travels to at least a first one of the plurality of destination locations;
(iv) identifying that the vehicle then travels to at least a second one of the plurality of originating locations; and
(v) identifying that the vehicle then travels to at least a second one of the plurality of destination locations; and
wherein determining whether the vehicle is being used as a private vehicle for an on-demand delivery service includes:
determining, based at least on (i)-(v), that the vehicle is being used as a private vehicle for an on-demand delivery service.

10. The method of claim 1, wherein identifying the pattern of travel based on the travel route over the predetermined period of time includes:
identifying whether the travel route is a holding pattern; and
wherein determining whether the vehicle is being used as a private vehicle for an on-demand delivery service includes:
determining, when the travel route is the holding pattern, that the vehicle is being used as a private vehicle for an on-demand delivery service.

11. A system for determining vehicle usage, comprising:
a navigation system, configured to track movement of a vehicle;
one or more processors; and
a memory communicably coupled to the one or more processors and storing a route identification module including instructions that when executed by the one or more processors cause the one or more processors to identify a travel route of the vehicle based on at least the tracked movement of the vehicle;
a use determination module including instructions that when executed by the one or more processors cause the one or more processors to:
identify a pattern of travel based on the travel route over a predetermined period of time, wherein the instructions to identify the pattern of travel based on the travel route over the predetermined period of time further include instructions to:
identify a plurality of destination locations in the travel route;
identify whether a time spent at one or more of the plurality of destination locations is shorter than a predetermined duration; and
determine whether the vehicle is being used as a private vehicle for an on-demand delivery service based on the pattern of travel; and
a notification module including instructions that when executed by the one or more processors cause the one or more processors to:
when the vehicle is being used as a private vehicle for the on-demand delivery service, generate a notification to an entity associated with the vehicle, wherein the notification includes information relating to the vehicle being used as a private vehicle for the on-demand delivery service.

12. The system of claim 11, wherein the instructions to identify the pattern of travel based on the travel route over the predetermined period of time further include instructions to:
detect whether the vehicle remains on while the vehicle is at one or more of the plurality of destination locations; and
wherein the instructions to determine whether the vehicle is being used as a private vehicle for an on-demand delivery service further include instructions to:
determine, when the time spent at one or more of the plurality of destination locations is shorter than the predetermined duration and the vehicle remains on while the vehicle is at one or more of the plurality of destination locations, that the vehicle is being used as a private vehicle for an on-demand delivery service.

13. The system of claim 12, further comprising a sensor operable to detect occupancy in the vehicle;
wherein the use determination module further includes instructions that when executed by the one or more processors cause the one or more processors to receive occupancy data from the sensor as the vehicle is approaching one or more of the plurality of destination locations; and
wherein the instructions to determine whether the vehicle is being used as a private vehicle for an on-demand delivery service further include instructions to determine, when the vehicle is being used as a private vehicle for an on-demand delivery service and the occupancy data is indicative of at least one passenger, that the on-demand delivery service is a ride-sharing service.

14. The system of claim 12, further comprising a sensor operable to detect occupancy in the vehicle;
wherein the use determination module further includes instructions that when executed by the one or more processors cause the one or more processors to receive occupancy data from the sensor as the vehicle is approaching one or more of the plurality of destination locations; and
wherein the instructions to determine whether the vehicle is being used as a private vehicle for an on-demand delivery service further include instructions to determine, when the vehicle is being used as a private vehicle for an on-demand delivery service and the occupancy data is indicative of at least one item, that the on-demand delivery service is an item delivery service.

15. The system of claim 12, further comprising a sensor operable to detect occupancy in the vehicle;
   wherein the use determination module further includes instructions that when executed by the one or more processors cause the one or more processors to receive occupancy data from the sensor as the vehicle is approaching one or more of the plurality of destination locations; and
   wherein the instructions to determine whether the vehicle is being used as a private vehicle for an on-demand delivery service further include instructions to determine, when the vehicle is being used as a private vehicle for an on-demand delivery service and the occupancy data is indicative of at least one food item, that the on-demand delivery service is a food delivery service.

16. The system of claim 11, wherein the instructions to identify the pattern of travel based on the travel route over the predetermined period of time further include instructions to:
   (i) identify an originating location and a plurality of destination locations in the travel route;
   (ii) identify that the vehicle travels to the originating location;
   (iii) identify that the vehicle then travels to at least a first one of the plurality of destination locations;
   (iv) identify that the vehicle then returns to the originating location; and
   (v) identify that the vehicle then travels to at least a second one of the plurality of destination locations; and
   wherein the instructions to determine whether the vehicle is being used as a private vehicle for an on-demand delivery service further include instructions to determine, based at least on (i)-(v), that the vehicle is being used as a private vehicle for an on-demand delivery service.

17. A non-transitory computer-readable medium for determining vehicle usage and including instructions that when executed by one or more processors cause the one or more processors to:
   identify a travel route of a vehicle using a navigation system;
   identify a pattern of travel based on the travel route over a predetermined period of time, wherein the instructions further include instructions to:
      identify a plurality of destination locations in the travel route;
      identify whether a time spent at one or more of the plurality of destination locations is shorter than a predetermined duration;
   determine whether the vehicle is being used as a private vehicle for an on-demand delivery service based on the pattern of travel; and
   when the vehicle is being used as a private vehicle for the on-demand delivery service, generate a notification to an entity associated with the vehicle, wherein the notification includes information relating to the vehicle being used as a private vehicle for the on-demand delivery service.

18. The non-transitory computer-readable medium of claim 17, wherein the instructions further include instructions to:
   detect whether the vehicle remains on while the vehicle is at one or more of the plurality of destination locations; and
   determine, when the time spent at one or more of the plurality of destination locations is shorter than the predetermined duration and the vehicle remains on while the vehicle is at one or more of the plurality of destination locations, that the vehicle is being used as a private vehicle for an on-demand delivery service.

19. The non-transitory computer-readable medium of claim 18, wherein the instructions further include instructions to:
   receive occupancy data from a sensor as the vehicle is approaching one or more of the plurality of destination locations; and
   determine, when the vehicle is being used as a private vehicle for an on-demand delivery service and the occupancy data is indicative of at least one passenger, that the on-demand delivery service is a ride-sharing service.

20. The non-transitory computer-readable medium of claim 18, wherein the instructions further include instructions to:
   receive occupancy data from a sensor as the vehicle is approaching one or more of the plurality of destination locations; and
   determine, when the vehicle is being used as a private vehicle for an on-demand delivery service and the occupancy data is indicative of at least one item, that the on-demand delivery service is an item delivery service.

* * * * *